United States Patent
Peck et al.

(10) Patent No.: US 9,999,875 B2
(45) Date of Patent: Jun. 19, 2018

(54) METHODS AND MATERIALS FOR DIRECT NOX DECOMPOSITION IN LEAN EXHAUST GASES

(71) Applicant: Toyota Motor Engineering & Manufacturing North America, Inc., Erlanger, KY (US)

(72) Inventors: Torin C. Peck, Ypsilanti, MI (US); Krishna Reddy Gunugunuri, Ann Arbor, MI (US); Chen Ling, Ann Arbor, MI (US); Hongfei Jia, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/140,087

(22) Filed: Apr. 27, 2016

(65) Prior Publication Data

US 2017/0312742 A1    Nov. 2, 2017

(51) Int. Cl.
| | | |
|---|---|---|
| *B01J 27/232* | (2006.01) | |
| *B01D 53/94* | (2006.01) | |
| *B01J 23/00* | (2006.01) | |
| *B01J 23/83* | (2006.01) | |
| *B01J 35/00* | (2006.01) | |

(52) U.S. Cl.
CPC ........ *B01J 27/232* (2013.01); *B01D 53/9413* (2013.01); *B01J 23/002* (2013.01); *B01J 23/83* (2013.01); *B01J 35/0006* (2013.01); *B01D 2255/402* (2013.01)

(58) Field of Classification Search
None
See application file for complete search history.

(56) References Cited

U.S. PATENT DOCUMENTS

| | | | |
|---|---|---|---|
| 6,521,202 B1 | 2/2003 | Vaughey et al. | |
| 2012/0159927 A1* | 6/2012 | Li | B01D 53/9422 60/274 |
| 2012/0180453 A1* | 7/2012 | Blint | B01D 53/9413 60/274 |
| 2015/0065337 A1 | 3/2015 | Sato et al. | |

FOREIGN PATENT DOCUMENTS

| | | |
|---|---|---|
| JP | 08229355 | 9/1996 |
| WO | 2012042070 A1 | 4/2012 |

OTHER PUBLICATIONS

Hang Hwan Kim et al, "Strontium-Doped Perovskites Rival Platinum Catalysts for Treating Nox in Simulated Diesel Exhaust", Science (Mar. 26, 2010), vol. 327, Issue 5973, pp. 1624-1627.
Hong Wang et al., "Nanometric La1-xKx MnO3 Perovskite-type oxides—highly active catalysts for the combustion of diesel soot particle under loose contact conditions", Catalysis Letters, Aug. 2005, vol. 102, Issue 3, pp. 251-256.
Seong-Soo Hong et al, "Catalytic removal of diesel soot particulates over LaMnO3 perovskite-type oxides", Studies in Surface Science and Catalysis, 2006, vol. 159, pp. 261-264.
Hong Wang et al., "The catalytic behavior of La—Mn—O nanoparticle perovskite-type oxide catalysts for the combustion of the soot particle from the diesel engine", Chinese Science Bulletin, Jul. 2005, vol. 50, Issue 14, pp. 1440-1444.
Hongmei An, et al. "Catalytic behavior of potassium containing compounds for diesel soot combustion", Applied Catalysis B: Environmental, Jan. 2006, vol. 62, Issues 1-2, pp. 46-56.
M. Haneda et al., "Alkali metal-doped cobalt oxide catalysts for NO decomposition", Applied Catalysis B Environmental Nov. 28, 2003; vol. 46, Issue 3, pp. 473-482.
Morris D. Argyle, "Supported, Alkali-Promoted Cobalt Oxide Catalysts for NOx Removal from Coal combustion Flue Gases" University of Wyoming Department of Chemical and Petroleum Engineering, Mar. 2006, (DE-FG26-04NT42181).

* cited by examiner

*Primary Examiner* — Sheng H Davis
(74) *Attorney, Agent, or Firm* — Dinsmore & Shohl LLP

(57) ABSTRACT

A noble metal-free lanthanum transition metal perovskite catalyst material. The noble metal-free lanthanum transition metal perovskite catalyst material may include a two phase mixture of a lanthanum transition metal perovskite with an alkali or alkaline earth metal carbonate, a lanthanum transition metal perovskite doped with an alkali or alkaline earth metal, or a combination thereof. The lanthanum transition metal perovskite catalyst material provides direct decomposition of NOx into $N_2$ and $O_2$ without the presence of a noble metal and in the presence of excess $O_2$.

11 Claims, 9 Drawing Sheets

METHODS AND MATERIALS FOR DIRECT NOX DECOMPOSITION IN LEAN EXHAUST GASES

TECHNICAL FIELD

The present specification generally relates to methods and materials for direct NOx decomposition in exhaust gases and, more specifically, to methods and materials for direct NOx decomposition in exhaust gases containing excess oxygen.

BACKGROUND

Future NOx emission requirements for vehicle engines will require catalytic NOx abatement technologies effective under lean-burn conditions. Direct NOx decomposition to $N_2$ and $O_2$ can be an attractive alternative to NOx traps and selective catalytic reduction. However, current catalysts suffer from catalytic activities too low for practical and effective direct decomposition of NOx and contain one or more noble metals which increase the cost of such catalysts.

Accordingly, a need exists for methods and materials that have improved catalytic activity for the direct decomposition of NOx under lean-burn conditions and do not contain noble metals.

SUMMARY

In one embodiment, a noble metal-free (NMF) catalyst for the direct decomposition of NOx to $N_2$ and $O_2$ in a lean exhaust gas may include a NMF catalyst material selected from at least one of a two phase mixture of a lanthanum (La) transition metal perovskite and an alkali or alkaline earth metal carbonate, and a La transition metal perovskite doped with an alkali or alkaline earth metal. The La transition metal perovskite may have a chemical formula of $La_{(1-y)}L'_{(y)}M_{(1-x)}M'_{(x)}O_3$ with $0.0 \leq y \leq 0.5$ and $0.0 \leq x \leq 0.5$, the alkali or alkaline earth metal (A) carbonate may have a chemical formula of $A_nCO_3$ (n=integer), and the alkali or alkaline earth metal dopant can be represented by A'. The symbol L' can be any combination of samarium (Sm), europium (Eu), gadolinium (Gd), terbium (Tb), dysprosium (Dy), lutetium (Lu), erbium (Er), ytterbium (Yb), praseodymium (Pr), neodymium (Nd), holmium (HO), bismuth (Bi) and yttrium (Y). The symbols M and M' can be any combination of iron (Fe), manganese (Mn), cobalt (Co), chromium (Cr), nickel (Ni), scandium (Sc), vanadium (V), niobium (Nb), tantalum (Ta), antimony (Sb), indium (In) and gallium (Ga). The selection and quantities of the elements in the $La_{(1-y)}L'_{(y)}M_{(1-x)}M'_{(x)}O_3$ provide a Goldschmidt tolerance factor for the $La_{(1-y)}L'_{(y)}M_{(1-x)}M'_{(x)}O_3$ material between 0.7 and 1.0, inclusive. The alkali or alkaline earth metal carbonate $A_nCO3$, when present, can be at least one carbonate of sodium (Na), potassium (K), magnesium (Mg), calcium (Ca), strontium (Sr) and barium (Ba) when the M is Mn, Fe, Co or Ni. It is appreciated that n=2 when A is Na or K, and n=1 when A is Mg, Ca, Sr or Ba. The alkali or alkaline earth metal dopant (A') can be at least one of Na, K, Mg, and Ba when M is Mn, Fe, Co or Ni.

In another embodiment, a method for the direct decomposition of NOx to $N_2$ and $O_2$ in a lean exhaust gas may include providing an internal combustion engine with an exhaust system. The exhaust system has an exhaust duct and a NMF catalyst containing at least one of a two phase mixture of a La transition metal perovskite and an alkali or alkaline earth metal carbonate, and a La transition metal perovskite doped with an alkali or alkaline earth metal. The La transition metal perovskite may have the chemical formula of $La_{(1-y)}L'_{(y)}M_{(1-x)}M'_{(x)}O_3$ with $0.0 \leq y \leq 0.5$ and $0.0 \leq x \leq 0.5$, the alkali or alkaline earth metal carbonate may have the chemical formula of $A_nCO_3$, and the alkali or alkaline earth metal dopant can be represented by A'. The symbol L' can be any combination of Sm, Eu, Gd, Tb, Dy, Lu, Er, Yb, Pr, Nd, Ho, Bi and Y. The symbols M and M' can be any combination of Fe, Mn, Co, Cr, Ni, Sc, V, Nb, Ta, Sb, In and Ga. The selection and the quantities of the elements in the $La_{(1-y)}L'_{(y)}M_{(1-x)}M'_{(x)}O_3$ also provide a Goldschmidt tolerance factor for the $La_{(1-y)}L'_{(y)}M_{(1-x)}M'_{(x)}O_3$ material between 0.7 and 1.0, inclusive. The alkali or alkaline earth metal carbonate $A_nCO_3$, when present, can be at least one carbonate of Na, K, Mg, Ca, Sr and Ba when the M is Mn, Fe, Co or Ni. The alkali or alkaline earth dopant can be at least one of Na, K, Mg, and Ba when M is Mn, Fe, Co or Ni. The method includes flowing an exhaust gas generated by the internal combustion engine and containing NOx and excess $O_2$ through the exhaust duct and into contact with the NMF catalyst. The NMF catalyst directly decomposes the NOx into $N_2$ and $O_2$.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
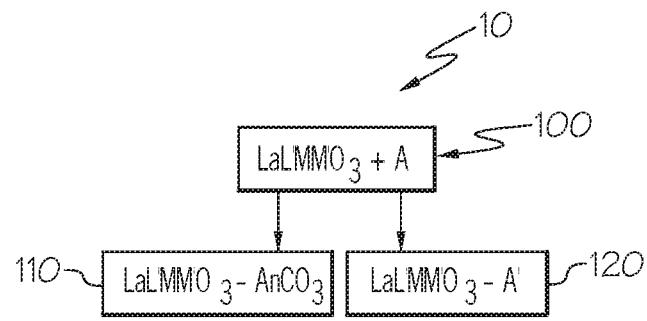
FIG. 1 depicts a noble metal-free La transition metal perovskite catalyst material according to one or more embodiments shown and described herein.

FIG. 1 generally depicts one embodiment of a NMF La transition metal perovskite catalyst material for the direct decomposition of NOx in an exhaust gas. The NMF La transition metal perovskite catalyst material can be a two phase mixture of a La transition metal perovskite and an alkali or alkaline earth metal carbonate, a La transition metal perovskite doped with an alkali or alkaline earth metal, or a combination thereof. The La transition metal perovskite catalyst materials have a high activity for the direct decomposition of NOx into $N_2$ and $O_2$, even in the presence of excess oxygen.

The La transition metal perovskite catalyst materials disclosed herein may be part of vehicle exhaust systems that provide direct decomposition of NOx under lean-burn conditions. It will be understood that the term "noble metal-free" as used herein refers to a catalyst material that has no intentional additions of a noble metal such as platinum, palladium, rhodium, etc.; the term "lean exhaust gas" as used herein refers to an exhaust gas generated by an internal combustion engine with excess oxygen; the term "lanthanide" or "lanthanide element" as used herein refers to the lanthanide series elements lanthanum (La), samarium (Sm), europium (Eu), gadolinium (Gd), terbium (Tb), dysprosium (Dy), lutetium (Lu), erbium (Er), ytterbium (Yb), praseodymium (Pr), neodymium (Nd), holmium (HO), post-transition metal bismuth (Bi) and transition metal yttrium (Y); and the term "transition metal" as used herein refers to the transition metal series elements iron (Fe), manganese (Mn), cobalt (Co), chromium (Cr), nickel (Ni), scandium (Sc), vanadium (V), niobium (Nb), tantalum (Ta), metalloid antimony (Sb), and post-transition metals indium (In) and gallium (Ga).

Still referring to FIG. 1, a NMF catalyst material is shown generally at reference numeral 10. The NMF catalyst material 10 may contain a La transition metal perovskite with a chemical formula of $La_{(1-y)}L'_{(y)}M_{(1-x)}M'_{(x)}O_3$, with $0.0 \leq y \leq 0.5$ and $0.0 \leq x \leq 0.5$, (referred to simply as LaL'MM'$O_3$ in the figures) and an alkali or alkaline earth metal (A) as illustrated at reference numeral 100 and referred to hereafter as $La_{(1-y)}L'_{(y)}M_{(1-x)}M'_{(x)}O_3+A$. In embodiments, the $La_{(1-y)}L'_{(y)}M_{(1-x)}M'_{(x)}O_3+A$ catalyst material 100 may be a two phase mixture of $La_{(1-y)}L'_{(y)}M_{(1-x)}M'_{(x)}O_3$ and an alkali or alkaline earth metal carbonate $A_nCO_3$ as illustrated at reference numeral 110 and referred to hereafter as $La_{(1-y)}L'_{(y)}M_{(1-x)}M'_{(x)}O_3$-$A_nCO_3$, i.e. the 'A' in the expression $La_{(1-y)}L'_{(y)}M_{(1-x)}M'_{(x)}O_3+A$ refers to an alkali or alkaline earth metal carbonate $A_nCO_3$. In other embodiments, the $La_{(1-y)}L'_{(y)}M_{(1-x)}M'_{(x)}O_3+A$ catalyst material 100 may be $La_{(1-y)}L'_{(y)}M_{(1-x)}M'_{(x)}O_3$ doped with an alkali or alkaline earth metal dopant (A') as illustrated at reference numeral 120 and referred to hereafter as $La_{(1-y)}L'_{(y)}M_{(1-x)}M'_{(x)}O_3$-A', i.e. the 'A' in the expression $La_{(1-y)}L'_{(y)}M_{(1-x)}M'_{(x)}O_3+A$ refers to an alkali or alkaline earth metal dopant A'. In embodiments, the $La_{(1-y)}L'_{(y)}M_{(1-x)}M'_{(x)}O_3+A$ catalyst material 100 may contain $La_{(1-y)}L'_{(y)}M_{(1-x)}M'_{(x)}O_3$-$A_nCO_3$ and $La_{(1-y)}L'_{(y)}M_{(1-x)}M'_{(x)}O_3$-A' and the alkali or alkaline earth metal in the $A_nCO_3$ carbonate may or may not be the same as the alkali or alkaline earth metal dopant A'. The concentration of the alkali or alkaline earth metal in the $A_nCO_3$ carbonate and/or the concentration of the alkali or alkaline earth metal dopant A' in the $La_{(1-y)}L'_{(y)}M_{(1-x)}M'_{(x)}O_3+A$ catalyst material 100 can be between 0.1 and 10.0 wt %, inclusive. In embodiments, the concentration of the alkali or alkaline earth metal in the $A_nCO_3$ carbonate and/or the concentration of the alkali or alkaline earth metal dopant A' in the $La_{(1-y)}L'_{(y)}M_{(1-x)}M'_{(x)}O_3+A$ catalyst material 100 can be between 0.5 and 5.0 wt %, inclusive. For the purposes of the present disclosure, the term "inclusive" means the inclusion of the first and last number listed, and all numbers in between. The La in the La transition metal perovskite can be partially substituted with one or more elements (L') selected from Sm, Eu, Gd, Tb, Dy, Lu, Er, Yb, Pr, Nd, Ho, Bi or Y. A particular transition metal (M) in the La transition metal perovskite can be partially substituted with one or more elements (M') selected from Fe, Mn, Co, Cr, Ni, Sc, V, Nb, Ta, Sb, In or Ga. Any combination of La with a different lanthanide element(s) L' and a transition metal M with a different transition element(s) M' result in the Goldschmidt Tolerance Factor (t) for the La transition metal perovskite to be within the predefined range of $0.7 \leq t \leq 1.0$. It is appreciated that the Goldschmidt Tolerance Factor as used herein is an indicator for the stability and distortion of the La transition metal crystal structure and is defined as:

$$t = \frac{r_{L'} + r_O}{\sqrt{2}\,(r_{M'} + r_O)} \qquad (1)$$

where $r_{L'}$ is the radius of the L'-cation, $r_{M'}$ is the radius of the M'-cation and $r_O$ is the radius of the anion (oxygen). It is also appreciated that for $t<0.7$ and $t>1.0$ the La transition metal perovskite crystal structure will not be cubic or orthorhombic/rhombohedral as desired. In embodiments, the $La_{(1-y)}L'_{(y)}M_{(1-x)}M'_{(x)}O_3$-$A_nCO_3$ catalyst material can include a carbonate of at least one of Na, K, Mg, Ca, Sr, and Ba and the $La_{(1-y)}L'_{(y)}M_{(1-x)}M'_{(x)}O_3$-A' catalyst material can be doped with at least one of Na, K, Mg, and Ba when M is at least one of Fe, Co, Mn, and Ni.

Figure 2:
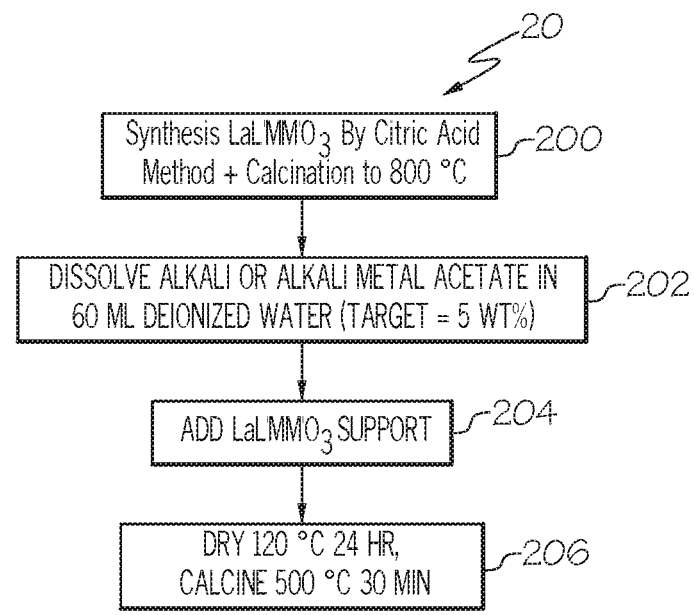
FIG. 2 depicts a process for making an La transition metal perovskite catalyst material according to one or more embodiments shown and described herein.

Referring to FIG. 2, a method for making a NMF La transition metal perovskite catalyst material is shown generally at reference numeral 20. The method includes synthesis of $La_{(1-y)}L'_{(y)}M_{(1-x)}M'_{(x)}O_3$ powder using the citric acid method and calcination up to 800° C. at step 200. An alkali or alkali metal solution is prepared at step 202 by dissolving an alkali or alkali metal in deionized. The amount of alkali or alkali metal added to the deionized water corresponds to a target of 5 weight percent (wt %) alkali or alkali metal in the $La_{(1-y)}L'_{(y)}M_{(1-x)}M'_{(x)}O_3$+A catalyst material. The $La_{(1-y)}L'_{(y)}M_{(1-x)}M'_{(x)}O_3$ powder produced in step 200 is added to the to the alkali or alkali metal solution at step 204 which is then dried at 120° C. for 24 hours and calcined at 500° C. for 30 minute at step 206. The citric acid method for the synthesis of $La_{(1-y)}L'_{(y)}M_{(1-x)}M'_{(x)}O_3$ includes wet impregnation of alkali or alkaline earth metal acetate followed by the drying and calcination. Examples of preparing a La transition metal perovskite with alkali metal carbonates are provided below.

Multiple batches of $La_{(1-y)}L'_{(y)}M_{(1-x)}M'_{(x)}O_3$ with y=1.0, x=1.0 and M=Fe, i.e. $LaFeO_3$, were synthesized with a target yield of 4 grams per batch. Between 7.016 and 7.136 grams of $La(NO_3)_3.6H_2O$, between 6.571 and 6.710 grams of $Fe(NO_3)_3.6H_2O$, and approximately 55 grams of deionized water were added to a glass beaker. The $La(NO_3)_3.6H_2O$ and $Fe(NO_3)_3.6H_2O$ were dissolved in the 55 grams of deionized water with magnetic stirring on a stir plate at ambient temperature for 30 minutes. Then, 6.100 to 6.401 grams of anhydrous citric acid was added to the glass beaker and the temperature was increased to 80° C. while maintaining stirring. After 2 hours, 1.225 milliliters of ethylene glycol was added to the glass beaker using a micropipette and the solution was stirred at 80° C. overnight and until it became a gel. Next, beakers containing the gels were placed in a drying oven and heated to 120° C. at 1° C./min and held at this temperature for 24 hours. The temperature was then increased to 130° C. and remained at this temperature for 4 hours to promote polyesterification. The temperature was then increased to 300° C. and held for 2 hours and a precursor powder of $LaFeO_3$ was produced. The resulting powder was ground thoroughly in an agate mortar and pestle, placed in a porcelain crucible, and then into a calcination furnace. The temperature of the calcination furnace was increased to room temperature to 800° C. at a rate of 10° C./min and remained at this temperature for 4 hours before cooling to ambient without temperature control.

The multiple batches of the $LaFeO_3$ powder were combined and again ground in a mortar and pestle. Three 100 milliliter glass beakers each had 2.250 grams of $LaFeO_3$ added thereto followed by 50 grams of distilled water mixed by stirring on a magnetic stir plate. Then, 0.7102 grams of Na acetate trihydrate was added to one of the beakers, 1.0582 grams of Mg acetate tetrahydrate was added to another of the beakers, and 0.2231 grams of Ba acetate was added to the third glass beaker. Each beaker was stirred at room temperature for 1 hour. The temperature was increased to 80° C. and stirring was maintained overnight. The resulting solutions were placed in an oven, the temperature increased to 120° C. at 1° C./min and held at this temperature for 24 hours to produce dried powders. The dried powders were removed from the beakers, ground in a mortar and pestle, and placed into crucibles which were placed in a calcination furnace. The temperature of the furnace was increased to 500° C. at 2° C./min and held for 30 minutes before returning to ambient temperature without temperature control. For the production of Sr and Ca containing $LaFeO_3$ catalyst materials, 1.600 grams of $LaFeO_3$ was added two 100 milliliter glass beakers. Then, 40 grams of water was added to each of the beakers and the solution was stirred on a magnetic stir plate. Next, 0.1996 grams of strontium acetate was added to one of the beakers and 0.3741 grams of calcium acetate monohydrate was added to the other beaker. Both beakers were stirred at room temperature for 1 hour. The temperature was increased to 80° C. and stirring was maintained overnight. The resulting solutions were placed in an oven and the temperature increased to 120° C. at 1° C./min and held at this temperature for 24 hours to produce dried powders. The dried powders were removed from the beakers, ground in a mortar and pestle, placed into crucibles, and the crucibles placed into a calcination furnace. The temperature of the calcination furnace was increased to 500° C. at 2°/min and held for 30 minutes before returning to ambient temperature without temperature control. Calcined powders with K, Ca and Sr acetate additions were also prepared in a similar manner.

Figure 3:
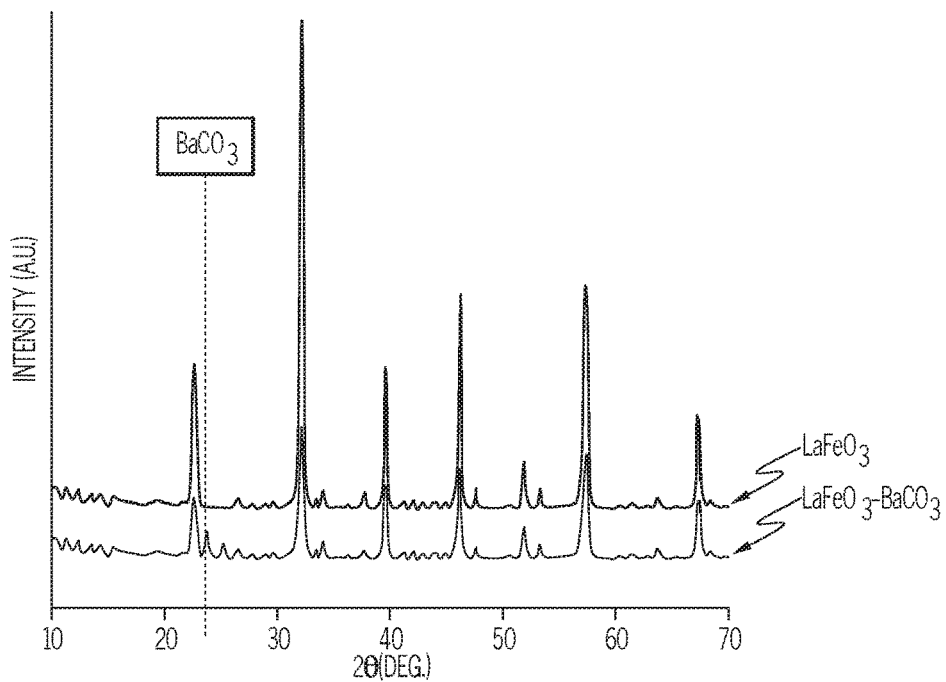
FIG. 3 depicts an x-ray diffraction (XRD) scan of a La transition metal perovskite catalyst material according to one or more embodiments shown and described herein.

Calcined powders produced according to the method shown in FIG. 2 were subjected to x-ray diffraction (XRD) to determine which phases were present. The powders were scanned from 10-70 2θ at 0.02°/step and 1°/minute. All of the sample powders showed the presence of $LaFeO_3$ with resulting peaks and unit cell values closely matching Powder Diffraction File (PDF) card #01-088-0641. Also, carbonates of Na, Ba, Sr, Mg, and Ca were detected and indexed to PDF cards. For example, FIG. 3 graphically depicts the XRD scan for the precursor $LaFeO_3$ powders and powders produced from the precursor $LaFeO_3$ plus barium acetate mixture. A peak for $BaCO_3$ was observed for the powders produced from the precursor $LaFeO_3$ plus barium acetate mixture, i.e. a two phase mixture of $LaFeO_3$ and $BaCO_3$ was detected. The alkali and alkaline earth metals did not incorporate (dope) into the perovskite structure of the $LaFeO_3$. For example, the $LaFeO_3$ unit cell did not match the unit cell value of $La^{0.9}Ba^{0.1}FeO_3$ which would be expected based on the quantity of Ba added to the material.

The activity of the $LaFeO_3$-alkali and alkaline earth metal carbonate mixtures was evaluated using a micro reactor system (Micromeritics Particulate Systems PID Microactivity Reactor) equipped with a quartz plug flow reactor and coupled with a mass spectrometer (MKS Cirrus-2). The NO concentration was tracked by the detector signal for M/Z 30. The evaluation included placing approximately 1 gram of each $LaFeO_3$-$A_nCO_3$ sample between a bed of quartz wool. The samples were preheated to 800° C. in ultrahigh purity helium (UHP He) and then cooled to 100° C. The UHP He was passed through the reactor with the powders for 15 minutes to determine 100% conversion of NO, i.e. 0.0% NO detected by the mass spectrometer. Then a reaction mixture containing 13.3 ml/min of UHP He and 14.5 ml/min of 1.911% NO/He was passed through a bypass around each $LaFeO_3$-$A_nCO_3$ sample for 30 minutes to determine 0% conversion of NO. The flow was stabilized over the catalyst for 30 minutes and the temperature was increased from 0 to 800° C. with a furnace ramp rate of 10°/min. The temperature was held at 800° C. for approximately 30 minutes to obtain data at steady state. Next, and to determine performance in excess oxygen, five oxygen concentrations of approximately 0.78%, 1.01%, 1.26%, 1.51%, and 1.78% were added to the reaction mixture for 30, 15, 15, 15, and 15 minutes, respectively.

Figure 4:
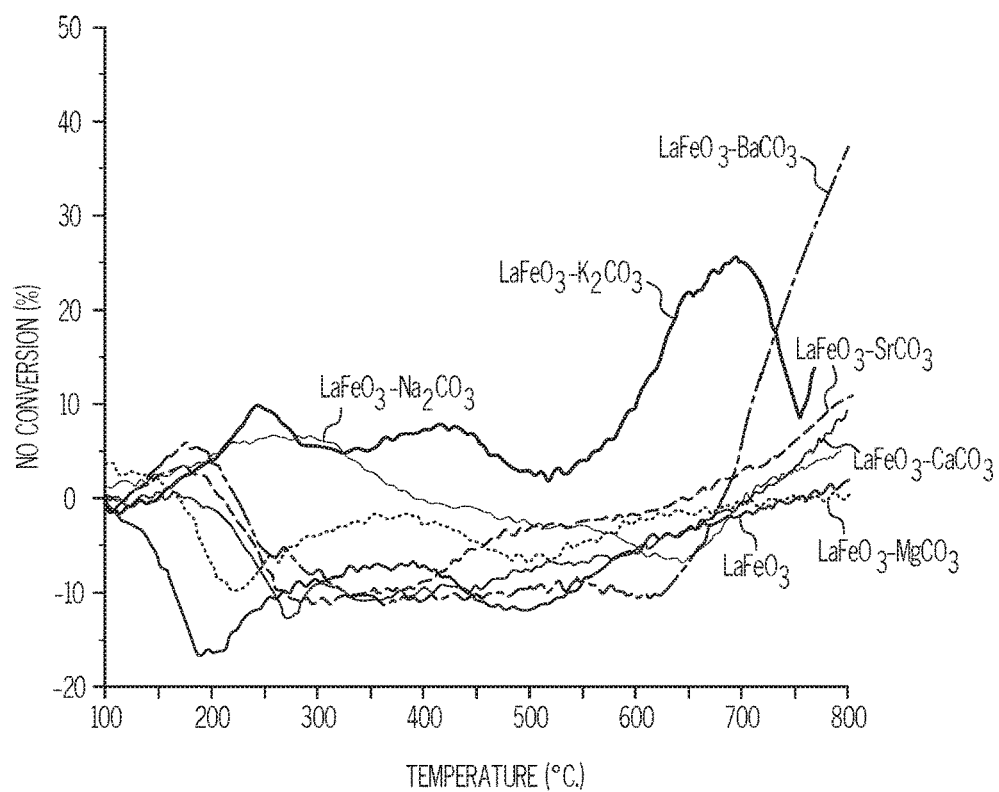
FIG. 4 graphically depicts NO conversion as a function of temperature for La transition metal perovskite catalyst materials according to one or more embodiments shown and described herein.

Referring to FIG. 4, results are shown for NO conversion as a function of temperature for NMF $LaFeO_3$—$BaCO_3$, $LaFeO_3$—$K_2CO_3$, $LaFeO_3$—$SrCO_3$, $LaFeO_3$—$CaCO_3$, $LaFeO_3$—$Na_2CO_3$ and $LaFeO_3$—$MgCO_3$ catalyst materials produced according to one or more embodiments disclosed herein. In addition, results for a baseline NMF $LaFeO_3$ material are shown. As shown in FIG. 4, the $LaFeO_3$—$Na_2CO_3$ and $LaFeO_3$—$MgCO_3$ catalyst materials perform similarly to $LaFeO_3$ at temperatures from about 600-800° C. Specifically, $LaFeO_3$—$Na_2CO_3$, $LaFeO_3$—$MgCO_3$ and $LaFeO_3$ have an approximate 0-5% NO conversion at temperatures between 600-800° C. In contrast, the NMF $LaFeO_3$—$CaCO_3$ and $LaFeO_3$—$SrCO_3$ catalyst materials provide an approximate 8-10% NO conversion at 800° C., and the $LaFeO_3$—$K_2CO_3$ and $LaFeO_3$—$BaCO_3$ catalyst materials show a significant improvement over the baseline $LaFeO_3$. The $LaFeO_3$—$K_2CO_3$ catalyst material provides an approximate 10% NO conversion at 600° C. and an approximate 25% NO conversion at 700° C. The $LaFeO_3$—$BaCO_3$ catalyst material provides an approximate 37-40% NO conversion at 800° C.

Figure 5:
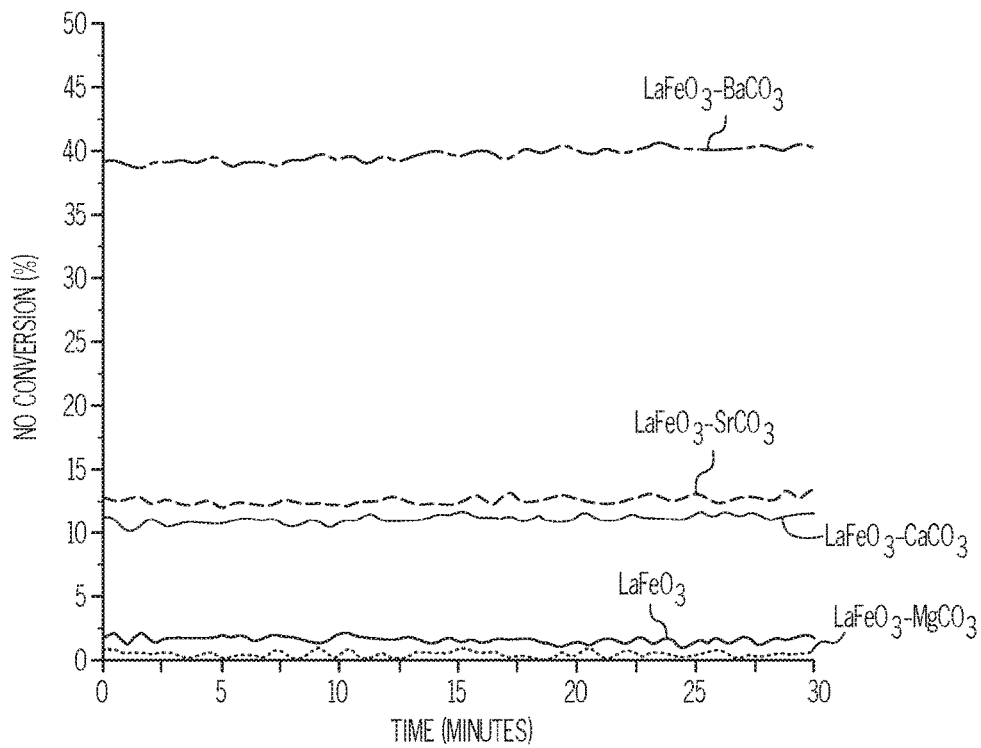
FIG. 5 graphically depicts NO conversion at 800° C. as a function of time for La transition metal perovskite catalyst materials according to one or more embodiments described herein.
Figure 6:
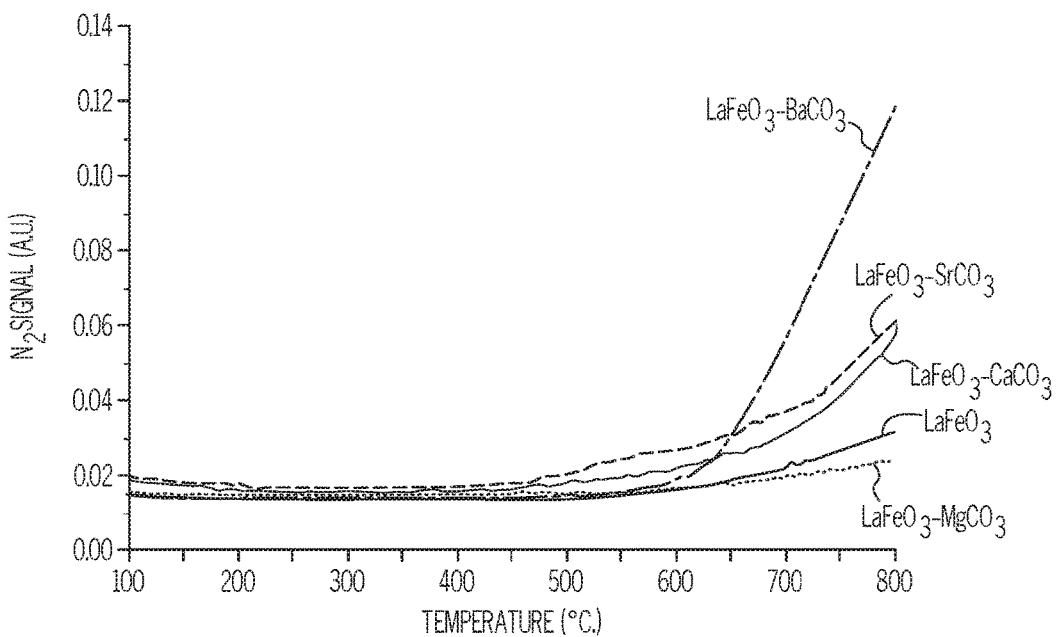
FIG. 6 graphically depicts $N_2$ signal as a function of temperature ($N_2$ release temperature) for La transition metal perovskite catalyst materials according to one or more embodiments described herein.
Figure 7:
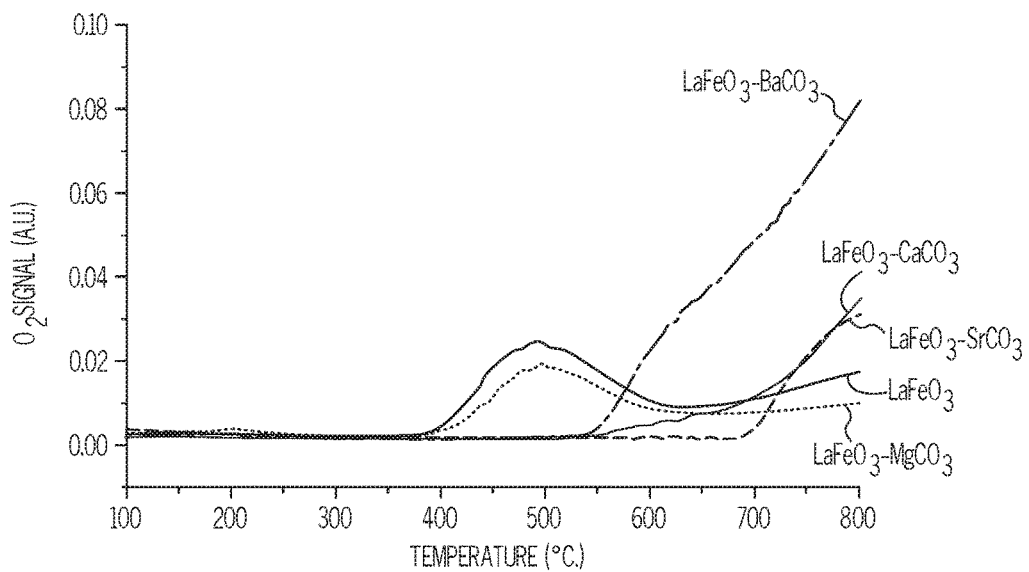
FIG. 7 graphically depicts $O_2$ signal as a function of temperature ($O_2$ release temperature) for La transition metal perovskite catalyst materials according to one or more embodiments described herein.
Figure 8:
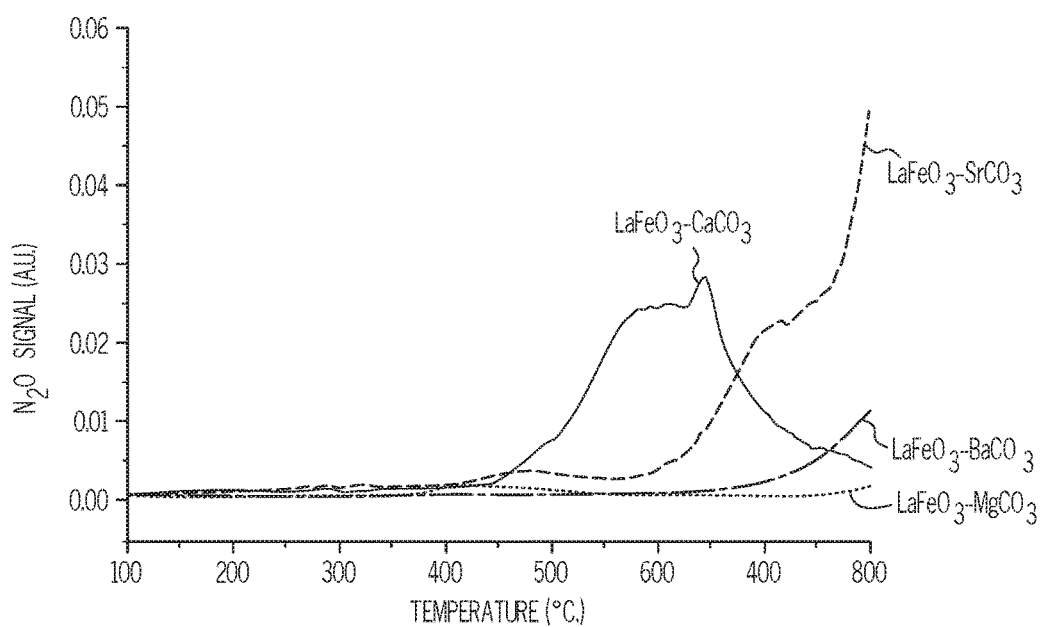
FIG. 8 graphically depicts $N_2O$ signal as a function of temperature ($N_2O$ release temperature) for La transition metal perovskite catalyst materials according to one or more embodiments described herein.
Figure 9:
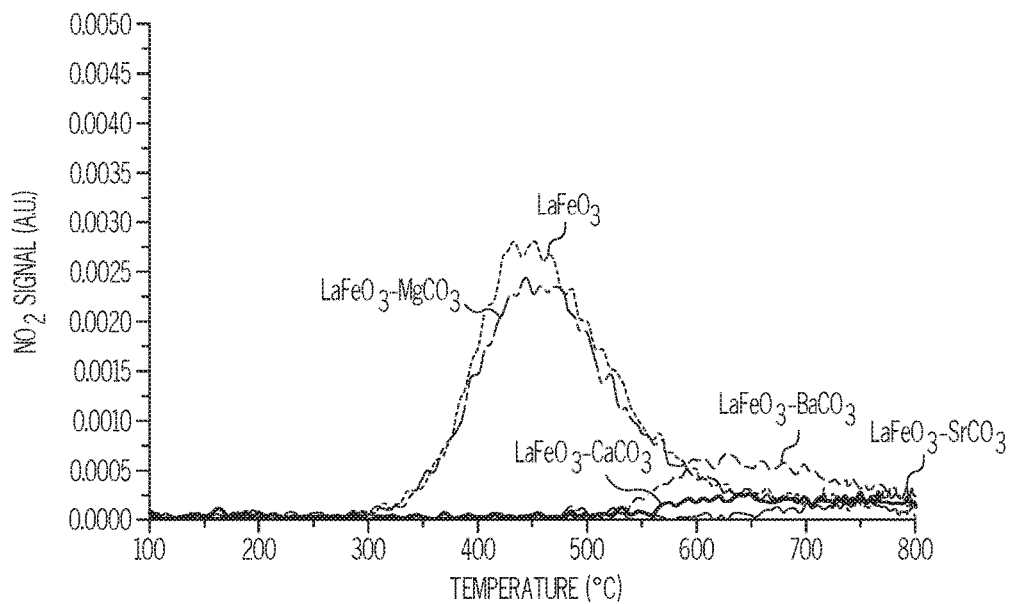
FIG. 9 graphically depicts $NO_2$ signal as a function of temperature ($NO_2$ release temperature) for La transition metal perovskite catalyst materials according to one or more embodiments described herein.

Referring to FIG. 5, results are shown for steady state NO conversion at 800° C. for the materials is shown in FIG. 4. Specifically, the baseline $LaFeO_3$ provided an approximate 2% NO conversion, $LaFeO_3$—$MgCO_3$ provided an approximate 1% NO conversion, $LaFeO_3$—$CaCO_3$ provided an approximate 11.5% NO conversion, $LaFeO_3$—$SrCO_3$ provided an approximate 12.5% NO conversion and $LaFeO_3$—$BaCO_3$ provided an approximate 40% NO conversion. The NMF $LaFeO_3$—$BaCO_3$ catalyst material exhibited an approximate 20-fold increase in NO conversion at 800° C. compared to the baseline $LaFeO_3$.

Referring to FIGS. 6, 7, 8, and 9, the release temperatures for the NMF $LaFeO_3$, $LaFeO_3$—$BaCO_3$, $LaFeO_3$—$SrCO_3$, $LaFeO_3$—$CaCO_3$ and $LaFeO_3$—$MgCO_3$ catalyst materials for $N_2$, $O_2$, $N_2O$, and $NO_2$ are shown. It should be appreciated that the release temperature is estimated for a given catalyst material at the inflection of a given signal-temperature curve, i.e. where the signal versus temperature curve shows a significant increase. Specifically, an $N_2$ release temperature (FIG. 6) for the $LaFeO_3$—$BaCO_3$ catalyst material is about 600-625° C., which is approximately 200° C. lower than the baseline $LaFeO_3$ catalyst material and approximately 150° C. lower than the $LaFeO_3$—$CaCO_3$ and $LaFeO_3$—$SrCO_3$ catalyst materials. The $O_2$ release temperature (FIG. 7) for the $LaFeO_3$—$BaCO_3$ catalyst material is about 550° C., which is approximately 150° C. lower than the $LaFeO_3$—$CaCO_3$ and the $LaFeO_3$—$SrCO_3$ catalyst materials, but about 150° C. higher than the baseline $LaFeO_3$ and the $LaFeO_3$—$MgCO_3$ catalyst material. The $N_2O$ release temperature (FIG. 8) for the $LaFeO_3$—$CaCO_3$ catalyst is approximately 450° C., which is approximately 200° C. less than the release temperature provided by the $LaFeO_3$—$SrCO_3$, and approximately 300° C. lower than the release temperature provided by the $LaFeO_3$—$BaCO_3$. The $NO_2$ release temperature (FIG. 9) for the baseline $LaFeO_3$ and the $LaFeO_3$—$MgCO_3$ is approximately 325° C., which is approximately 200° C. less than the release temperature provided $LaFeO_3$—$BaCO_3$ and approximately 250° C. less than the release temperature provided by $LaFeO_3$—$CaCO_3$.

Figure 10:
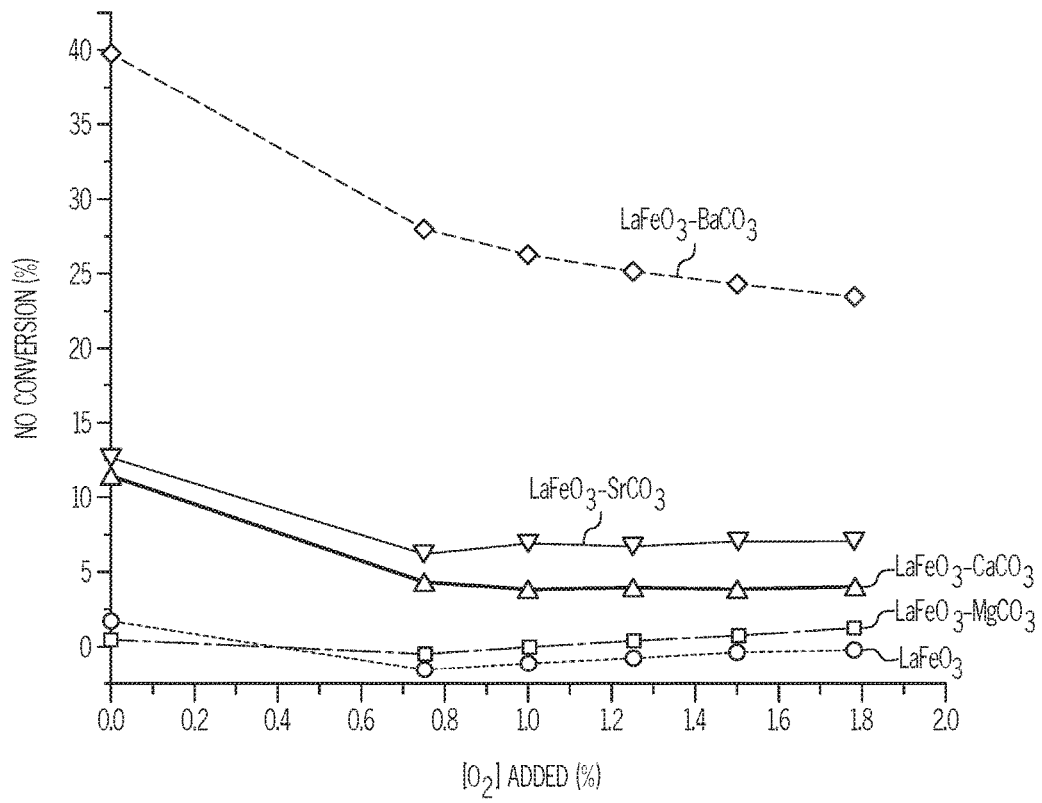
FIG. 10 graphically depicts percentage of NO conversion at 800° C. for exhaust gases with different $O_2$ contents for La transition metal perovskite catalyst materials according to one or more embodiments disclosed herein.
Figure 11:
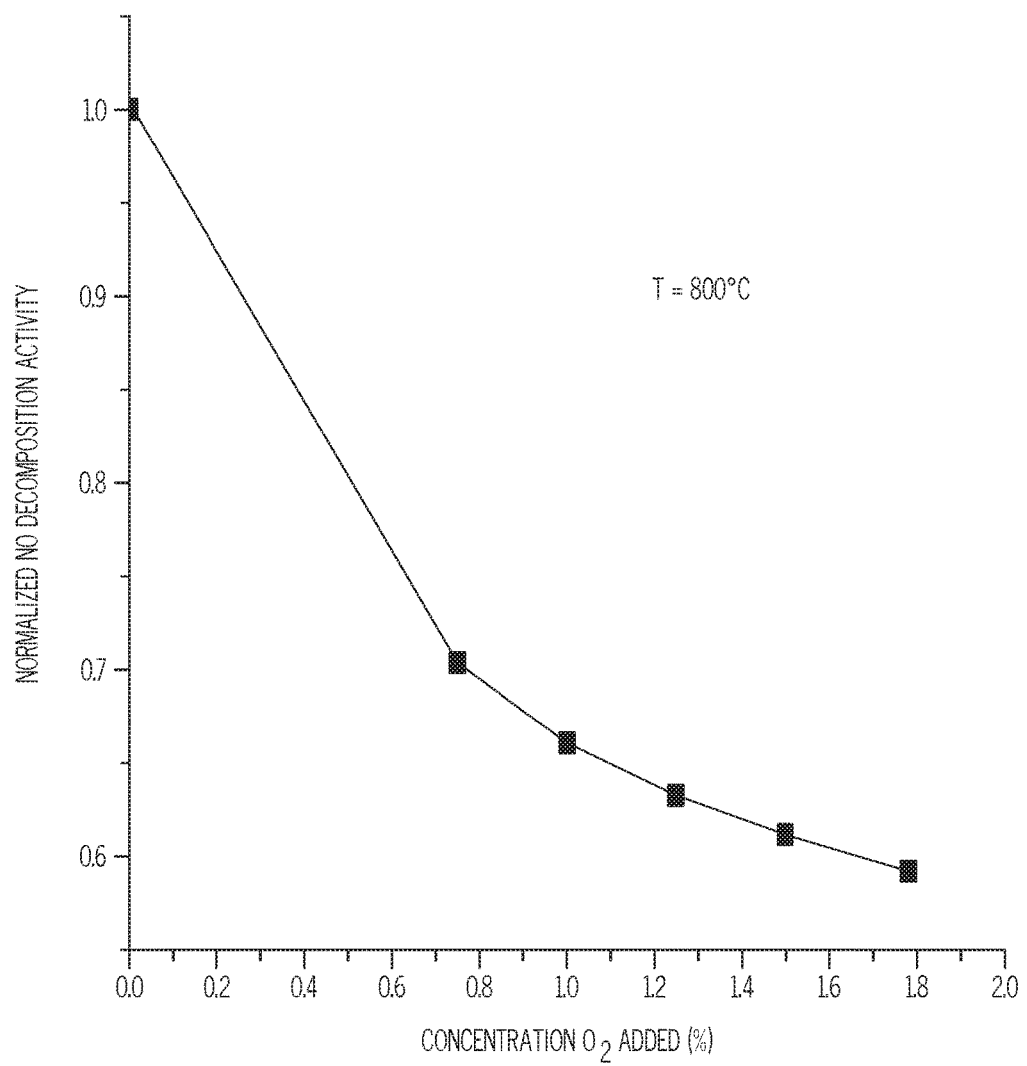
FIG. 11 graphically depicts normalized NO decomposition activity at 800° C. for exhaust gases with different $O_2$ contents for a Ba—$LaFeO_3$ catalyst material according to one or more embodiments disclosed herein.

The performance of the NMF $LaFeO_3$, $LaFeO_3$—$BaCO_3$, $LaFeO_3$—$SrCO_3$, $LaFeO_3$—$CaCO_3$ and $LaFeO_3$—$MgCO_3$ catalyst materials in the presence of excess oxygen is shown in FIG. 10. Specifically, the NO conversion of the NMF $LaFeO_3$, $LaFeO_3$—$BaCO_3$, $LaFeO_3$—$SrCO_3$, $LaFeO_3$—$CaCO_3$ and $LaFeO_3$—$MgCO_3$ catalyst materials tested at 800° C. in the 13.3 ml/min of UHP He+14.5 ml/min of 1.911% NO/UHP He gas mixture with the additions of 0.78%, 1.01%, 1.26%, 1.51%, and 1.78% $O_2$ are shown in FIG. 10. Regarding the $LaFeO_3$ and $LaFeO_3$—$MgCO_3$ catalyst materials, the NO conversion remained generally constant near 0.0% for all of the $O_2$ concentrations. For $LaFeO_3$—$CaCO_3$, the NMF catalyst material's NO conversion was reduced from approximately 11.5% for 0.0% $O_2$ to approximately 4.5% with 0.78% $O_2$ present I the gas mixture and down to approximately 4.0% with 1.01, 1.26, 1.51 and 1.78% $O_2$ present. Regarding $LaFeO_3$—$SrCO_3$, the NMF catalyst material's NO conversion was reduced from approximately 12.5% for 0.0% $O_2$ to approximately 7.0% with 0.78, 1.01, 1.26, 1.51 and 1.78% $O_2$ present in the gas mixture. Regarding $LaFeO_3$—$BaCO_3$, the NMF catalyst material's NO conversion was reduced from approximately 40.0% for 0.0% $O_2$ to approximately 28.0% with 0.78% $O_2$ present in the gas mixture, 26.5% with 1.01% $O_2$ present, 25.0% with 1.26% $O_2$ present, 24.0% with 1.51% $O_2$ present and 23.0% with 1.78% $O_2$ present. FIG. 11 shows the normalized NO decomposition activity for the $LaFeO_3$—$BaCO_3$ catalyst material as a function of $O_2$ in the reaction mixture. It should be appreciated that the $LaFeO_3$—$BaCO_3$ catalyst material exhibits a normalized NO decomposition activity of approximately 0.6 even with 1.8% excess $O_2$ in the reaction mixture.

Figure 12:
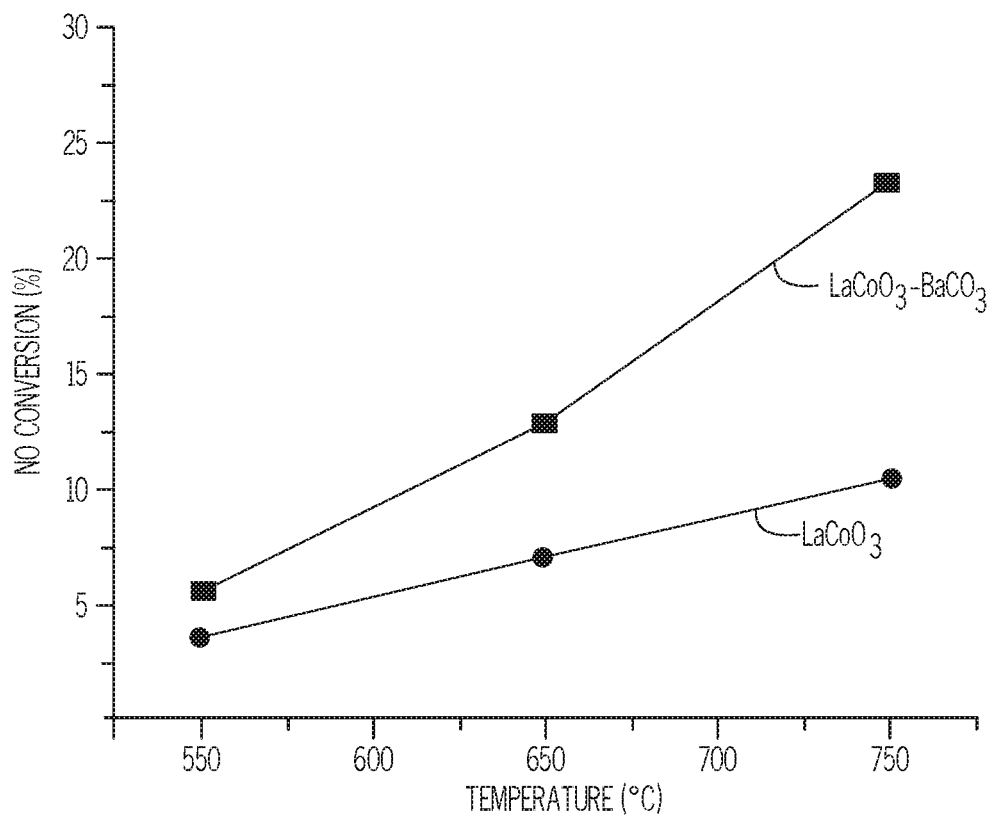
FIG. 12 graphically depicts NO conversion as a function of temperature for La transition metal perovskite catalyst materials according to one or more embodiments shown and described herein.

Referring to FIG. 12, NO conversion as a function of temperature for a baseline $La_{(1-y)}L'_{(y)}M_{(1-x)}M'_{(x)}O_3$ with y=1.0, x=1.0 and M=Co, i.e. $LaCoO_3$, and a NMF $LaCoO_3$—$BaCO_3$ catalyst material is shown. The $LaCoO_3$ and $LaCoO_3$—$BaCO_3$ materials were produced according to the citric acid method described above. As shown in FIG. 12, adding $BaCO_3$ to the $LaCoO_3$ material provides an increase of NO conversion activity compared to the baseline $LaCoO_3$ material of approximately 1.5-2.0% at 550° C. At 650° C., adding $BaCO_3$ to the $LaCoO_3$ material provides an increase of NO conversion activity compared to the baseline $LaCoO_3$ material of approximately 5.0%, and at 750° C. the addition of $BaCO_3$ to the $LaCoO_3$ material provides an increase of NO conversion activity compared to the baseline $LaCoO_3$ material of approximately 12.5%. Accordingly, it should be appreciated that a wide range of NMF $La_{(1-y)}L'_{(y)}M_{(1-x)}M'_{(x)}O_3$+A catalyst materials are disclosed herein for the direct decomposition of NOx.

Figure 13A:
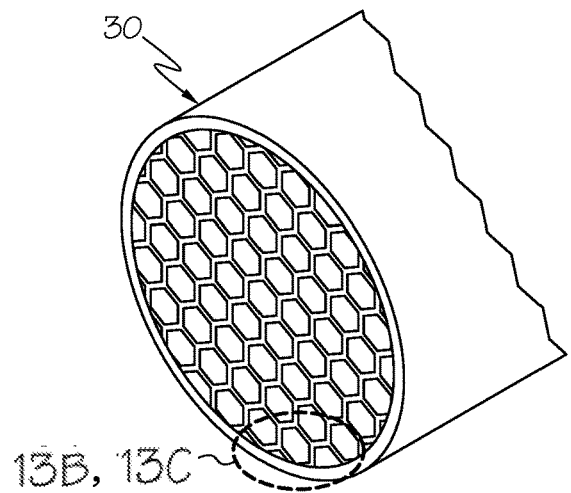
FIG. 13A depicts La transition metal perovskite catalyst materials in a honeycomb shaped catalyst according to one or more embodiments described herein.
Figure 13B:
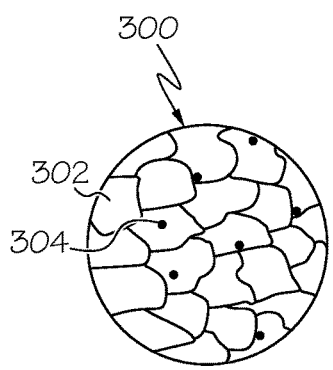
FIG. 13B depicts a microstructure for La transition metal perovskite catalyst materials according to one or more embodiments described herein.
Figure 13C:
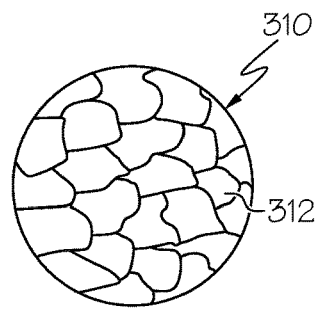
FIG. 13C depicts a microstructure for La transition metal perovskite catalyst materials according to one or more embodiments described herein.
Figure 14:
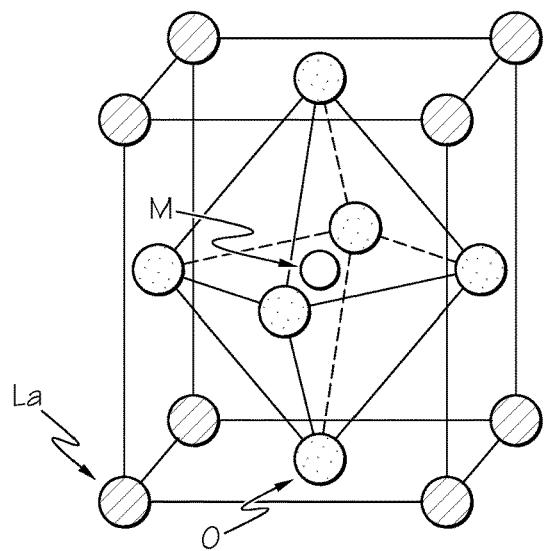
FIG. 14 depicts a crystal structure of La transition metal perovskite catalyst materials according to one or more embodiments described herein.

Referring to FIG. 13A, a honeycomb catalyst 30 made from a NMF $La_{(1-y)}L'_{(y)}M_{(1-x)}M'_{(x)}O_3$+A catalyst material according to one or more embodiments disclosed herein is shown. In embodiments, the NMF $La_{(1-y)}L'_{(y)}M_{(1-x)}M'_{(x)}O_3$+A catalyst material has a microstructure of $La_{(1-y)}L'_{(y)}M_{(1-x)}M'_{(x)}O_3$ grains 302 with precipitates or particles $A_nCO_3$ 304 as shown at reference numeral 300 in FIG. 13B. The mixture of $La_{(1-y)}L'_{(y)}M_{(1-x)}M'_{(x)}O_3$-$A_nCO_3$ shown at reference numeral 300 can include precipitates, particles, etc. of $A_nCO_3$ within $La_{(1-y)}L'_{(y)}M_{(1-x)}M'_{(x)}O_3$ grains, at $La_{(1-y)}L'_{(y)}M_{(1-x)}M'_{(x)}O_3$ grain boundaries, at triple junctions between $La_{(1-y)}L'_{(y)}M_{(1-x)}M'_{(x)}O_3$ grains, etc. In other embodiments, the NMF $La_{(1-y)}L'_{(y)}M_{(1-x)}M'_{(x)}O_3$+A catalyst material has a microstructure of $La_{(1-y)}L'_{(y)}M_{(1-x)}M'_{(x)}O_3$ grains 312 doped with an alkali or alkaline earth metal at shown at reference numeral 310 in FIG. 13C. The $La_{(1-y)}L'_{(y)}M_{(1-x)}M'_{(x)}O_3$-A' catalyst material shown at reference numeral 310 can have atoms of alkali and alkaline earth metals at La, M and/or O sites within a perovskite crystal structure (see FIG. 14).

Figure 15:
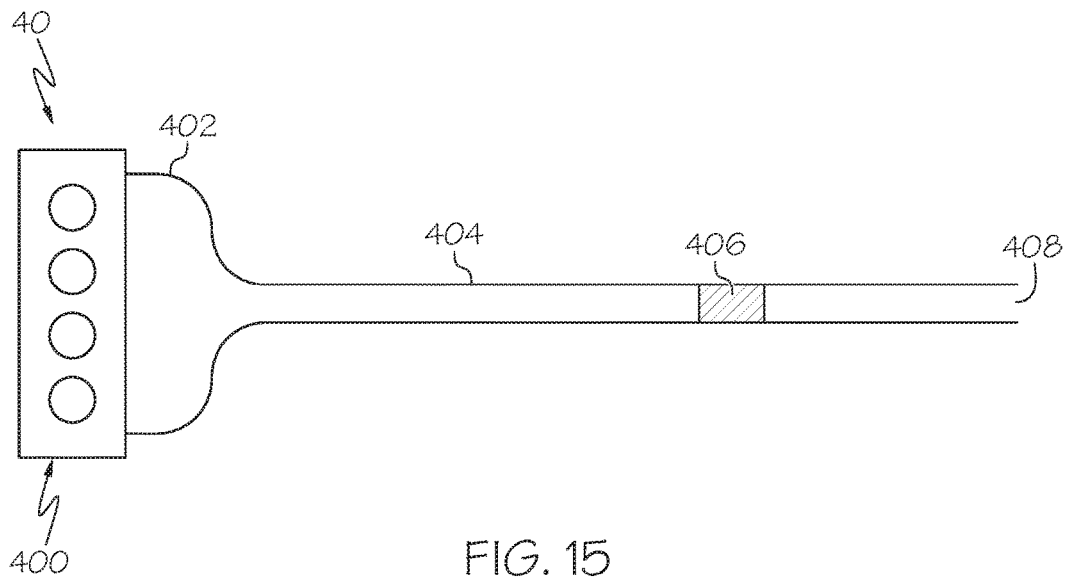
FIG. 15 depicts an internal combustion engine with an exhaust system that has a La transition metal perovskite catalyst material according to one or more embodiments described herein.

Referring now to FIG. 15, an internal combustion engine with a NMF $La_{(1-y)}L'_{(y)}M_{(1-x)}M'_{(x)}O_3$+A catalyst material according to one or more embodiments is shown generally at reference numeral 40. The internal combustion engine 40 has an engine block 400 with a plurality of cylinders and an exhaust manifold 402 that receives exhaust gas from the plurality of cylinders during operation of the internal combustion engine 40. The internal combustion engine 40 can be a spark-ignition internal combustion engine (petrol engine), a compression-ignition internal combustion engine (diesel engine) or a combination spark-ignition/compression-ignition internal combustion engine. The exhaust manifold 402 is in fluid communication with an exhaust duct 404 and exhaust gas originating from the one or more cylinders in the engine block 400 flows through the exhaust manifold 402, the exhaust duct 404 out an exhaust exit 408. Within the exhaust duct 404 is a $La_{(1-y)}L'_{(y)}M_{(1-x)}M'_{(x)}O_3$+A catalyst material 406. The $La_{(1-y)}L'_{(y)}M_{(1-x)}M'_{(x)}O_3$+A catalyst material 406 can be at least one of the two phase mixture $La_{(1-y)}L'_{(y)}M_{(1-x)}M'_{(x)}O_3$-$A_nCO_3$ illustrated at reference numeral 300 in FIG. 13B and the $La_{(1-y)}L'_{(y)}M_{(1-x)}M'_{(x)}O_3$-A' illustrated at reference numeral 310 in FIG. 13C. The $La_{(1-y)}L'_{(y)}M_{(1-x)}M'_{(x)}O_3$+A catalyst material 406 can be in the form of a honeycomb such as the honeycomb catalyst 30 illustrated in FIG. 13A, but it should be appreciated that other shapes and structures that are at least partially made from the $La_{(1-y)}L'_{(y)}M_{(1-x)}M'_{(x)}O_3$+A catalyst material can be used.

Figure 16:
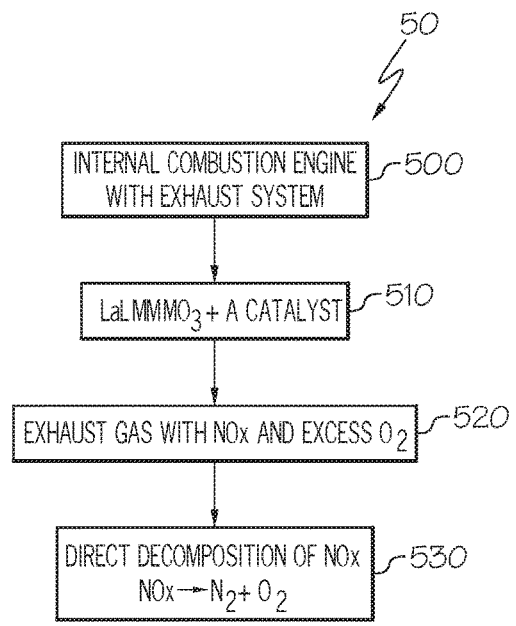
FIG. 16 depicts a process for the direct decomposition of NOx in an exhaust gas with excess $O_2$ using a La transition metal perovskite catalyst material according to one or more embodiments described herein.

Referring now to FIG. 16, a method for the direct decomposition of NOx is shown generally at reference numeral 50. The method 50 includes providing an internal combustion engine with an exhaust system at step 500. The exhaust system has an exhaust duct and a NMF La transition metal perovskite catalyst material according to one or more embodiments disclosed herein. In embodiments, the LMF transition metal perovskite catalyst material is a $La_{(1-y)}L'_{(y)}M_{(1-x)}M'_{(x)}O_3$+A catalyst material, for example $La_{(1-y)}L'_{(y)}M_{(1-x)}M'_{(x)}O_3$-$A_nCO_3$ ($0.0 \leq y \leq 0.5$; $0.0 \leq x \leq 0.5$), $La_{(1-y)}L'_{(y)}M_{(1-x)}M'_{(x)}O_3$-A' ($0.0 \leq y \leq 0.5$; $0.0 \leq x \leq 0.5$), or a combination thereof. The La in the La transition metal perovskite can be partially substituted with one or more elements (L') selected from Sm, Eu, Gd, Tb, Dy, Lu, Er, Yb, Pr, Nd, Ho, Bi or Y. A particular transition metal (M) in the La transition metal perovskite can be partially substituted with one or more elements (M') selected from Fe, Mn, Co, Cr, Ni, Sc, V, Nb, Ta, Sb, In or Ga. Any combination of La with a different lanthanide element(s) L' and a transition metal M with a different transition element(s) M' result in the Goldschmidt Tolerance Factor (t) for the La transition metal perovskite to be within the predefined range of $0.7 < t < 1.0$. Exhaust gas with NOx and excess $O_2$ is generated by the internal combustion engine, e.g. during lean-burn conditions, at step 520. The exhaust gas with NOx and excess $O_2$ flows through the exhaust system and into contact with the NMF $La_{(1-y)}L'_{(y)}M_{(1-x)}M'_{(x)}O_3$+A catalyst material. Upon contact with the $La_{(1-y)}L'_{(y)}M_{(1-x)}M'_{(x)}O_3$+A catalyst material, NOx in the exhaust gas decomposes into $N_2$ and $O_2$, e.g. $2NO \rightarrow N_2+O_2$, even with excess oxygen in the exhaust gas.

The NMF $La_{(1-y)}L'_{(y)}M_{(1-x)}M'_{(x)}O_3$+A catalyst materials and methods for the direct decomposition of NOx disclosed herein can be used with other exhaust gas catalysts, sensors, etc. When used as part of an exhaust system, the NMF $La_{(1-y)}L'_{(y)}M_{(1-x)}M'_{(x)}O_3$+A catalyst materials have sufficient activity for the direct decomposition of NOx such that noble metals are not needed. The terms "approximately" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A noble metal-free (NMF) catalyst for the direct decomposition of NOx to $N_2$ and $O_2$ in a lean exhaust gas comprising:
   a two phase mixture of a La transition metal perovskite with a chemical formula of $La_{(1-y)}L'_{(y)}M_{(1-x)}M'_{(x)}O_3$ ($0.0 \leq y \leq 0.5$; $0.0 \leq x \leq 0.5$) and an alkali or alkaline earth metal carbonate with a chemical formula of $A_nCO_3$ (n=integer), the two phase mixture comprising precipitates of $A_nCO_3$ or particles of $A_nCO_3$ within grains of $La_{(1-y)}L'_{(y)}M_{(1-x)}M'_{(x)}O_3$, at $La_{(1-y)}L'_{(y)}M_{(1-x)}M'_{(x)}O_3$ grain boundaries, or at triple junctions between $La_{(1-y)}L'_{(y)}M_{(1-x)}M'_{(x)}O_3$ grains;
   wherein:
   L' is any combination of Sm, Eu, Gd, Tb, Dy, Lu, Er, Yb, Pr, Nd, Ho, Bi or Y, and M and M' are any combination of Fe, Mn, Co, Cr, Ni, Sc, V, Nb, Ta, Sb, In or Ga, when a Goldschmidt tolerance factor for $La_{(1-y)}L'_{(y)}M_{(1-x)}M'_{(x)}O_3$ is between 0.7 and 1.0, inclusive; and
   $A_nCO_3$ is a carbonate of Na, K, Mg, Ca, Sr and Ba.

2. The NMF catalyst of claim 1, wherein the two phase mixture is a powder comprising the La transition metal perovskite and the alkali or alkaline earth metal carbonate.

3. The NMF catalyst of claim 2, wherein M is at least one of Fe and Co.

4. The NMF catalyst of claim 3, wherein $A_nCO_3$ is at least one of $CaCO_3$, $SrCO_3$, $K_2CO_3$ and $BaCO_3$.

5. The NMF catalyst of claim 4, wherein $A_nCO_3$ is $BaCO_3$ and a concentration of Ba in the NMF catalyst material is between 0.1 to 10 wt %, inclusive.

6. The NMF catalyst of claim 5, wherein M is Fe, y equals 0 and x equals 0.

7. A noble metal-free (NMF) catalyst for the direct decomposition of NOx to $N_2$ and $O_2$ in a lean exhaust gas comprising:
   a two phase mixture of a La transition metal perovskite with a chemical formula of $La_{(1-y)}L'_{(y)}M_{(1-x)}M'_{(x)}O_3$ ($0.0 \leq y \leq 0.5$; $0.0 \leq x \leq 0.5$) and an alkali or alkaline earth metal carbonate with a chemical formula of $A_nCO_3$ (n=integer), the two phase mixture comprising precipitates of $A_nM_3$ or particles of $A_nCO_3$ within grains of $La_{(1-y)}L'_{(y)}M_{(1-x)}M'_{(x)}O_3$, at $La_{(1-y)}L'_{(y)}M_{(1-x)}M'_{(x)}O_3$ grain boundaries, or at triple junctions between $La_{(1-y)}L'_{(y)}M_{(1-x)}M'_{(x)}O_3$ grains;
   L' is any combination of Sm, Eu, Gd, Tb, Dy, Lu, Er, Yb, Pr, Nd, Ho, Bi or Y, and M and M' are any combination of Fe, Mn, Co, Cr, Ni, Sc, V, Nb, Ta, Sb, In or Ga when a Goldschmidt tolerance factor for $La_{(1-y)}L'_{(y)}M_{(1-x)}M'_{(x)}O_3$ is between 0.7 and 1.0, inclusive; and
   $A_nCO_3$ is a carbonate of Na, K, Mg, Ca, Sr and Ba.

8. The NMF catalyst of claim 7, wherein M is at least one of Fe and Co, and $A_nCO_3$ is at least one of $CaCO_3$, $SrCO_3$, $K_2CO_3$ and $BaCO_3$.

9. The NMF catalyst of claim 8, wherein $A_nCO_3$ is $BaCO_3$.

10. The NMF catalyst of claim 9, wherein a concentration of Ba in the two phase mixture of the La transition metal perovskite and the alkali or alkali metal carbonate is between 0.1 to 10 wt %, inclusive.

11. The NMF catalyst of claim 9, wherein M is Fe, y equals 0 and x equals 0.

* * * * *